United States Patent [19]

Baker et al.

[11] 4,184,566

[45] Jan. 22, 1980

[54] MARINE ENGINE NOISE SUPPRESSOR

[75] Inventors: Kenneth R. Baker, Woodland Hills; Robert T. DeVault, Simi Valley, both of Calif.

[73] Assignee: Maritec Corporation, Canoga Park, Calif.

[21] Appl. No.: 904,392

[22] Filed: May 10, 1978

[51] Int. Cl.² ............................................. F01N 1/14
[52] U.S. Cl. .................................. 181/261; 181/269; 181/283
[58] Field of Search ............... 181/235, 233, 240, 238, 181/255, 249, 260, 261, 269

[56] References Cited

U.S. PATENT DOCUMENTS

| | | | |
|---|---|---|---|
| 1,061,775 | 5/1913 | Newton et al. | 181/260 |
| 1,074,627 | 10/1913 | Kenney | 181/261 |
| 1,089,259 | 3/1914 | Patten | 181/261 |
| 1,926,723 | 9/1933 | Jahnke | 181/261 |
| 2,360,429 | 10/1944 | Leadbetter | 181/260 |

Primary Examiner—L. T. Hix
Assistant Examiner—Benjamin R. Fuller
Attorney, Agent, or Firm—William H. Maxwell

[57] ABSTRACT

A noise suppressor for internal combustion engine exhaust, adapted for marine use wherein water coolant is discharged into the chamber of a single-walled riser and partially vaporized by the exhaust gases directed into the dome thereof for downward redirection and discharge from the lower portion of the riser chamber through a muffler element, and preferably through the hull chest and/or cover of a jet pump drive acting as the final noise barrier to atmosphere.

20 Claims, 2 Drawing Figures

MARINE ENGINE NOISE SUPPRESSOR

BACKGROUND

This invention relates to the suppression of exhaust noise from internal combustion engines used to drive boats, particularly speed boats. Although adapted especially to jet-driven boats, this exhaust system is also effective with propeller-drive boats, it being a general objective of this invention to substantially suppress noise with a concealed system.

Heretofore, the standard exhaust systems for use with boats have used water-jacketed risers acting as traps to prevent backflow of water into the engine, combined with and/or followed by a muffler. These risers are characteristically U-shaped pipes extending well above the water line, and directed over or through the boat transom. And, there have been underwater exhausts used in outboard units and various inboard installations as well. However, it is an objective here to provide a noise suppression exhaust system for jet drives, and namely a "THROUGH JET EXHAUST" system that is highly effective, and a system that is concealed.

Replacing the usual water jacketed double-walled silencer chamber of the prior art, this invention provides a simplified expansion chamber with its internal surface cooled by means of water injection. In other words, the characteristic riser is replaced by a single noise suppressing expansion chamber, as distinguished from a water jacketed U-shaped exhaust pipe having no capability of noise suppression. With the present invention, an exhaust stack discharges upwardly into the expansion chamber for primary noise suppression, and a muffler element occupies the lower portion thereof for secondary noise suppression. An additional third stage of noise suppression is also gained by discharge of the exhaust through the jet mounting chest, which conceals it and puts it underwater at lower speeds. The water injection is from the engine coolant system, which is hot water that is sprayed onto the interior of the chamber where it is heated by the exhaust gases, the heat of exhaust converting a partial or substantial amount if not all of said water into steam vapor, or so that the water is discharged as a mist with the products of combustion.

SUMMARY OF THE INVENTION

The exhaust system herein disclosed is primarily a "THROUGH JET EXHAUST" system adapted particularly to a jet-drive boat that employs a pump driven by an internal combustion prime mover to supply thrust. This system provides quiet underwater exhaust at low speeds, and an efficient noise barrier at high speeds; and in either case the aforesaid primary and secondary noise suppression is most effective. This system is adapted for use with various types of engines, and is most effective with automotive engines converted to marine use by the attachment of water-cooled manifolds that discharge from an exhaust stack into a novel single-walled expansion chamber which is cooled by means of internal water injection. With the present invention, water is sprayed into the top of the chamber to cool the area heated by the engine exhaust gases, which are ducted into said chamber through an upturned exhaust stack. The redirected and descending exhaust gases are then collected through a perforated muffler element, which may vary in design so as to achieve any degree of compromise between flow losses and sound control desired. Leaving the expansion chamber, the exhaust gases pass through an elbow and thence into the jet mounting chest, externally of the buoyant hull. Thus, the exhaust escapes to atmosphere by flowing around the jet drive unit and within its housing, for concealment.

DRAWINGS

The various objects and features of this invention will be fully understood from the following detailed description of the typical preferred form and application thereof, throughout which description reference is made to the accompanying drawing in which.

PREFERRED EMBODIMENT

Figure 1:
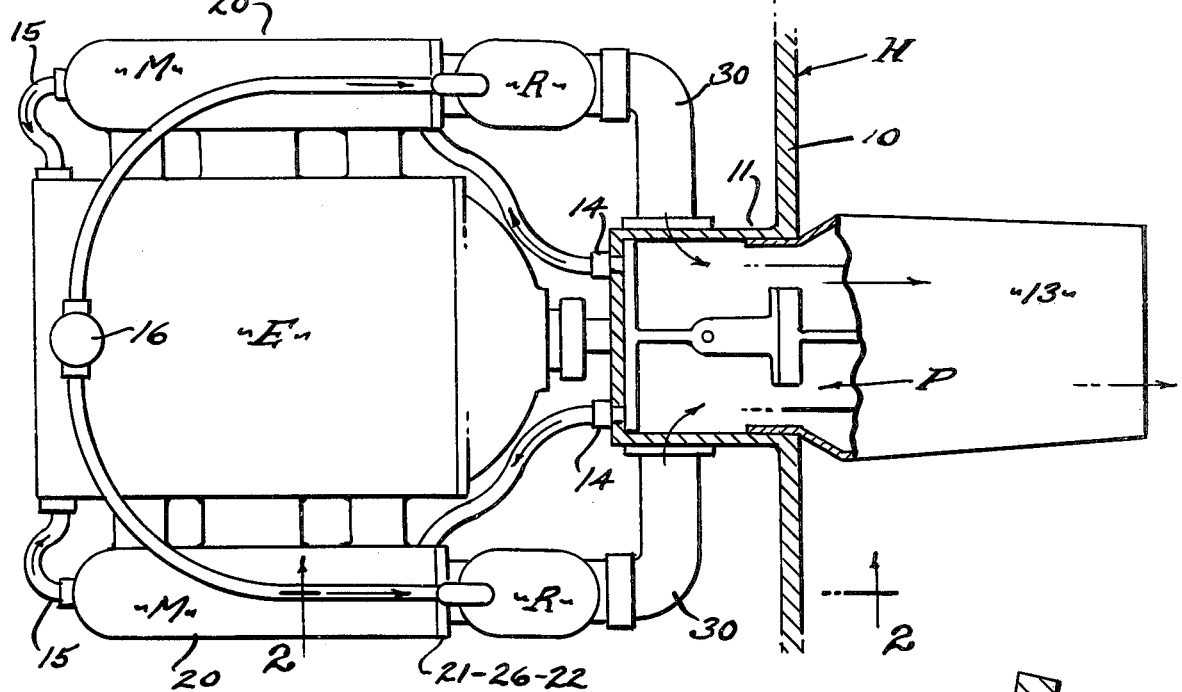
FIG. 1 is a plan view of an engine installation utilizing the "THROUGH JET EXHAUST" of the present invention.
Figure 2:
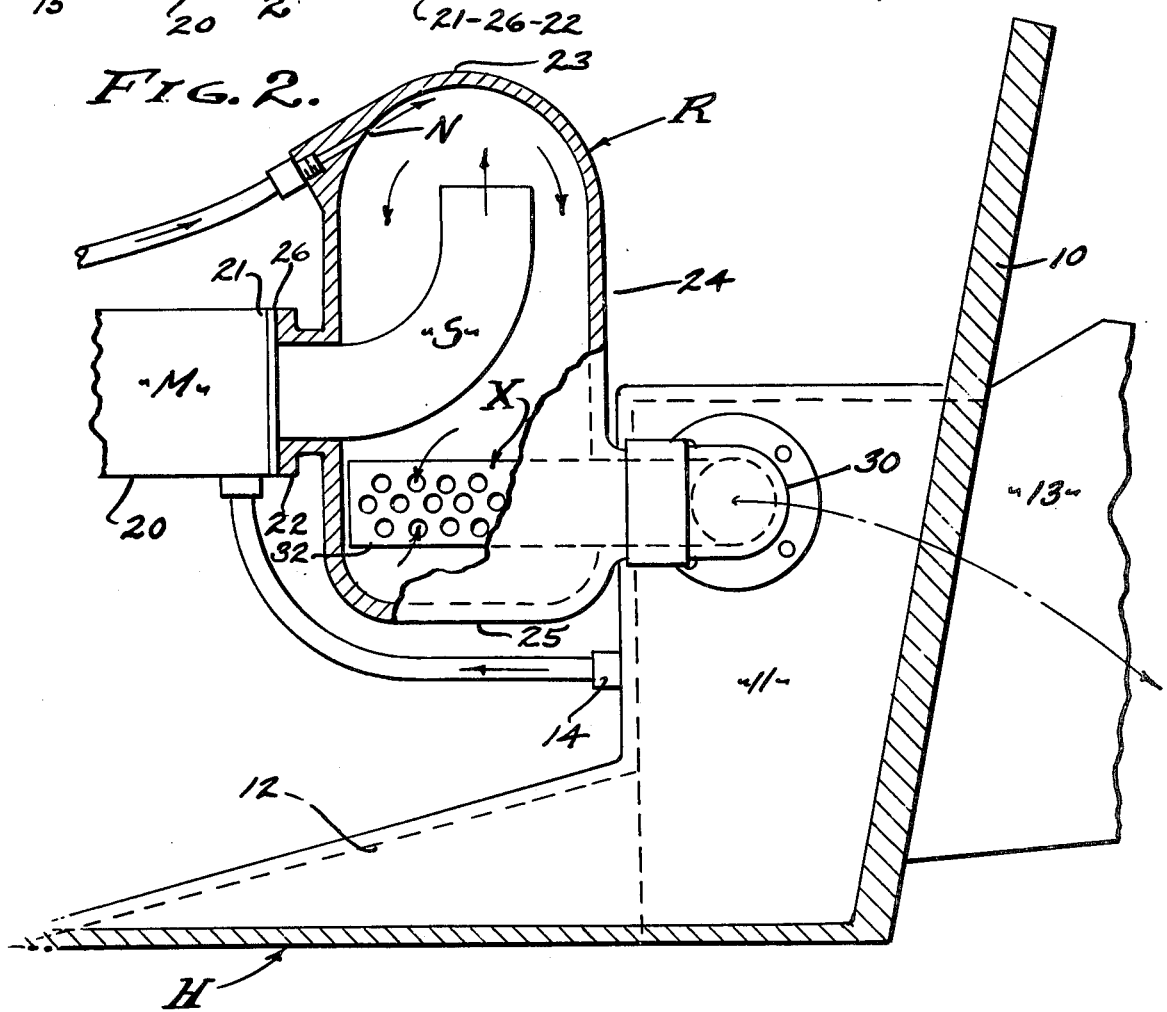
FIG. 2 is an enlarged detailed sectional view taken substantially as indicated by line 2—2 of FIG. 1.

Referring now to the drawings, there is a boat hull H in which an engine E is installed at the stern and in close proximity to the transom 10. The hull is formed with a jet mounting cavity or chest 11 that receives the jet pump P as a unit with its horizontally disposed drive shaft entering into the hull and coupled directly to the engine. The water intake 12 slopes forwardly from the chest 11 to open along the hull bottom, and a cover 13 continues rearwardly from the chest 11 to extend over the pump unit, opening beneath and rearwardly for operation of the jet and suited for the emission of exhaust. The engine E can vary widely in its configuration, however it is an internal combustion engine characterized by cylinder exhaust ports (not shown) which discharge into a manifold M. In accordance with marine practices, the manifold M is jacketed and supplied with circulating coolant, in the case illustrated with water out of the jet pump P a 14 (both right and left). The coolant water is circulated through the jacketed manifold and into the engine at 15 (right and left) for cooling of the cylinders and heads in the usual manner. Discharge of coolant water from the engine is at 16 where the heated water is available for discharge through the noise suppressor or suppressors (right and left) as will be described.

In accordance with this invention there is a riser R of substantial volume which presents an expansion chamber, a stack S discharging upwardly into said chamber, and a muffler element X collecting exhaust gases at the lower portion of the chamber and opening into the chest 11 surrounding the jet pump P, or directly to atmosphere over or through the boat transom. A feature of this invention is the injection of coolant water from source 16 by means of one or more spray nozzles N within the said riser chamber.

The engine manifold M is an elongated collector of exhaust gases, with a water jacket 20 throughout its length. Water is drawn from the jet pump P at 14 and circulated through the jacket 20, and through the engine E for discharge at 16. As shown, the manifold M opens rearwardly and has a flange connection 21 to the riser R, the riser being bolted directly thereto; for the flow of exhaust gases only.

In accordance with this invention, the riser R is disposed to extend upwardly, and well above the water line of the boat hull in which the installation is made. This upward extension of the riser is for accommodating the exhaust stack S which is turned upwardly therein to open well above said water line, and well below the top of the riser so as to avoid excessive back pressure. The stack S is in the nature of an elbow, flanged at 26 to be captured between the flange connection 21 of manifold M and the flange 22 of the riser. The riser R also extends downwardly from the manifold level and entrance therein of the stack S, this downward extension being for the accommodation of and rearward opening of the muffler element X. Accordingly, the riser R has its mounting flange 22 fixed to the connection 21 and is characterized by its single wall construction with a rounded dome 23 and preferably with rounded sides 24 and bottom 25. The configurations of the turned stack S and elongated muffler element X are most conveniently accommodated in a flattened riser (laterally flattened), it being understood that this configuration can vary as circumstances require, for example the riser can be a cylindrical tube with hemispherical ends. In practice, the muffler element X is horizontally disposed within the chamber of the riser R at or above the water line of the boat hull.

In carrying out this invention the riser R is a singlewalled aluminum casting, in which case the dome 23 and walls 24 and 25 are integrally formed. And, in accordance with this invention the spray nozzle is disposed to spray hot coolant water onto the interior wall of said dome 23. It will be observed that the exhaust stack S is a short "L", preferably of steel tubing, and from its close proximity to the exhaust manifold M and cylinder ports will discharge hot afterburning exhaust gases to impinge upon the dome interior before turning downwardly in the riser chamber. It is at this area of high heat that the coolant water is discharged and vaporized by the exhaust and turned downwardly toward the lower end of the riser chamber.

The muffler element X is a replaceable insert of tube form, captured in working position by the coupling of a connection 30 in the form of an elbow, or the like, opening into the chest 11, and thence to atmosphere. The muffler element X is a perforated tube 32 through which the suppressed gases emanate at a low noise level.

From the foregoing it will be seen that the riser R is of simple practical construction, and that both the stack S and muffler element X are easily replaceable. The discharge of engine coolant water is advantageously used in the water injection technique which has its cooling effect within the riser by means of vaporization when subjected to the hot exhaust gases impinged upon the interior of the dome 23. This riser R and stack S arrangement is the primary noise suppressor, by virtue of the 180° turning of the gases and diffusion of reflected sound by the water injection and simultaneous vaporization thereof. The secondary noise suppression is by means of the muffler element X, through which the escaping gases and vapors are baffled and discharged to atmosphere, preferably into the hull chest 11 and through the jet pump housing or cover 13 surrounding the pump unit P and which presents a third and final sound barrier.

Although a vertical disposition of the riser R is described herein, it is to be understood that angular dispositions are common and workable, that is the riser is dynamically operable whether upright or lying on its side or at any angle therebetween. The convenience and simple practicality of this jet exhaust is therefore readily apparent.

Having described only a typical preferred form and application of our invention, we do not wish to be limited or restricted to the specific details herein set forth, but wish to reserve to ourselves any modifications or variations that may appear to those skilled in the art as set forth within the limits of the following claims:

I claim:

1. An internal combustion engine exhaust noise suppressor, including; a vertically disposed singlewalled riser forming an expansion chamber with a dome and an opposite lower portion, an exhaust stack entering from the engine exhaust and into the chamber and having an opening disposed to discharge the exhaust upwardly against an interior wall of said riser dome, water injection means directing water over the interior wall of the dome of the riser for cooling and primary noise suppression by vaporization forming a cushioning layer, and a muffler element for secondary noise suppression and extending into the lower portion of the chamber to receive the exhaust gases and water vapors caused by the exhaust heat acting upon said water injection and opened to atmosphere.

2. The engine exhaust noise suppressor as set forth in claim 1, wherein the singlewalled riser expansion chamber receives both the exhaust stack and muffler element replaceably inserted therein.

3. The engine exhaust noise suppressor as set forth in claim 1, wherein the exhaust stack is of elbow form entering the side of the riser and turned upwardly therein for discharge of said exhaust against the interior wall of the riser dome.

4. The engine exhaust noise suppressor as set forth in claim 1, wherein the muffler element is of perforated form being horizontally disposed in said bottom portion of the chamber.

5. The engine exhaust noise suppressor as set forth in claim 1, wherein the water injection means sprays water over the interior wall of said riser dome.

6. The engine exhaust noise suppressor as set forth in claim 1, wherein the water injection means sprays water over the interior wall of said riser dome, and wherein the exhaust stack is of elbow form entering the side of the riser and turned upwardly therein for discharge of said exhaust against the interior wall of the riser dome.

7. The engine exhaust noise suppressor as set forth in claim 1, wherein the water injection means sprays water over the interior wall of said riser dome, and wherein the muffler element is of perforated form being horizontally disposed in said bottom portion of the chamber.

8. The engine exhaust noise suppressor as set forth in claim 1, wherein the singlewalled riser expansion chamber receives both the exhaust stack and muffler element replaceably inserted therein, wherein the water injection means sprays water over the interior wall of said riser dome, and wherein the exhaust stack is of elbow form entering the side of the riser and turned upwardly therein for discharge of said exhaust against the interior wall of said riser dome.

9. The engine exhaust noise suppressor as set forth in claim 1, wherein the singlewalled riser expansion chamber receives both the exhaust stack and muffler element replaceably inserted therein, wherein the water injection means sprays water over the interior wall of said riser dome, and wherein the muffler element is of perforated form being horizontally disposed in said bottom portion of the chamber.

10. The engine exhaust noise suppressor as set forth in claim 1, wherein the singlewalled riser expansion chamber receives both the exhaust stack and muffler element replaceably inserted therein, wherein the water injection means sprays water over the interior wall of said riser dome, wherein the exhaust stack is of elbow form entering the side of the riser and turned upwardly therein for discharge of said exhaust against the interior of said riser dome, and wherein the muffler element is of perforated form being horizontally disposed in said bottom portion of the chamber.

11. An exhaust noise suppressor for internal combustion marine engines having coolant water discharge, and including; a vertically disposed singlewalled riser forming an expansion chamber with a dome and an opposite lower portion, an exhaust stack extending from the engine and into the chamber and having an opening disposed to discharge the exhaust upwardly against an interior wall of said riser dome, water injection means directing said coolant water over the interior wall of the dome of the riser for cooling and primary noise suppression by vaporization forming a cushioning layer, and a muffler element for secondary noise suppression and extending into the lower portion of the chamber to receive the exhaust gases and water vapors caused by the exhaust heat acting upon said water injection and opening to atmosphere.

12. The marine engine exhaust noise suppressor as set forth in claim 11, wherein the singlewalled riser expansion chamber receives both the exhaust stack and muffler element replaceably inserted therein.

13. The marine engine exhaust noise suppressor as set forth in claim 11, wherein the exhaust stack is of elbow form entering the side of the riser and turned upwardly therein for discharge of said exhaust against the interior wall of the riser dome.

14. The marine engine exhaust noise suppressor as set forth in claim 11, wherein the muffler element is of perforated form being horizontally disposed in said bottom portion of the chamber.

15. The marine engine exhaust noise suppressor as set forth in claim 11, wherein the water injection means sprays water over the interior wall of said riser dome.

16. An exhaust noise suppressor for the internal combustion engines of jet pump drive boats having coolant water discharge, and including; a vertically disposed singlewalled riser forming an expansion chamber with a dome and an opposite lower portion, an exhaust stack extending from the engine and into the chamber and having an opening disposed to discharge the exhaust upwardly against an interior wall of said riser dome, water injection means directing said coolant water discharge over the interior wall of the dome of the riser for cooling and primary noise suppression by vaporization forming a cushioning layer, and a muffler element for secondary noise suppression and extending into the lower portion of the chamber to receive the exhaust gases and water vapors caused by the exhaust heat acting upon said water injection and opened to atmosphere through a hull chest and cover enclosing the jet pump drive and forming a sound barrier.

17. The marine engine exhaust noise suppressor for jet pump drive boats as set forth in claim 16, wherein the singlewalled riser expansion chamber receives both the exhaust stack and muffler element replaceably inserted therein.

18. The marine engine exhaust noise suppressor for jet pump drive boats as set forth in claim 16, wherein the exhaust stack is of elbow form entering the side of the riser and turned upwardly therein for discharge of said exhaust against the interior wall of the riser dome.

19. The marine engine exhaust noise suppressor for jet pump drive boats as set forth in claim 16, wherein the muffler element is of perforated form being horizontally disposed in said bottom portion of the chamber.

20. The marine engine exhaust noise suppressor for jet pump drive boats as set forth in claim 16, wherein the water injection means sprays water over the interior wall of said riser dome.

* * * * *